(12) United States Patent
Mitsuhashi

(10) Patent No.: US 8,460,145 B2
(45) Date of Patent: Jun. 11, 2013

(54) ROTATION MECHANISM

(75) Inventor: Atsutaka Mitsuhashi, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 546 days.

(21) Appl. No.: 12/663,093

(22) PCT Filed: Feb. 7, 2008

(86) PCT No.: PCT/JP2008/052027
§ 371 (c)(1),
(2), (4) Date: Jan. 8, 2010

(87) PCT Pub. No.: WO2008/152829
PCT Pub. Date: Dec. 18, 2008

(65) Prior Publication Data
US 2010/0180705 A1  Jul. 22, 2010

(30) Foreign Application Priority Data
Jun. 11, 2007  (JP) .................................. 2007-153831

(51) Int. Cl.
*F16H 1/32* (2006.01)
(52) U.S. Cl.
USPC ............ 475/162; 475/344; 475/904; 297/362
(58) Field of Classification Search
USPC .......... 475/162, 331, 362, 344, 904; 297/362, 297/362.11, 362.12, 362.13, 362.14
See application file for complete search history.

(56) References Cited

U.S. PATENT DOCUMENTS

| | | | | |
|---|---|---|---|---|
| 3,982,445 | A | * | 9/1976 | Rouverol ......................... 74/462 |
| 4,469,375 | A | * | 9/1984 | Boyer ............................ 297/362 |
| 4,538,855 | A | * | 9/1985 | Peetz et al. ..................... 297/362 |
| 4,884,844 | A | * | 12/1989 | Kershaw et al. ............... 297/362 |

(Continued)

FOREIGN PATENT DOCUMENTS

| | | |
|---|---|---|
| JP | 2002-34697 | 2/2002 |
| JP | 2003-507101 | 2/2003 |

(Continued)

OTHER PUBLICATIONS

English language Abstract of JP 2005-230116, Sep. 2, 2005.

(Continued)

*Primary Examiner* — David D Le
*Assistant Examiner* — Steven B Christ
(74) *Attorney, Agent, or Firm* — Greenblum & Bernstein, P.L.C.

(57) ABSTRACT

Each of reclining devices is formed so as to have a different size. An external gear wheel of each of the reclining devices has a diameter smaller than an internal gear wheel thereof and has a teeth number different from the internal gear wheel. The internal gear wheels and the external gear wheels of the connection devices respectively have the same teeth number as each other. The internal gear wheels and the external gear wheels of the connection devices are formed such that distances between centers thereof are equal to each other. Further, a meshing line of the internal gear wheel and the external gear wheel of each of the connection devices is formed between two curves defining a meshing range and is drawn as a line that extends from a side of a radially inwardly positioned curve in a circumferential direction in which the two curves are gradually spaced from each other and reaches to a side of a radially outwardly positioned curve.

3 Claims, 14 Drawing Sheets

U.S. PATENT DOCUMENTS

| | | | |
|---|---|---|---|
| 5,030,184 A * | 7/1991 | Rennerfelt | 475/162 |
| 5,188,571 A * | 2/1993 | Boltze et al. | 475/162 |
| 5,586,833 A * | 12/1996 | Vossmann et al. | 403/359.6 |
| 5,634,689 A * | 6/1997 | Putsch et al. | 297/362 |
| 6,076,889 A * | 6/2000 | Su et al. | 297/362 |
| 6,619,743 B1 | 9/2003 | Scholz et al. | |
| 6,692,397 B2 * | 2/2004 | Wang et al. | 475/162 |
| 6,726,281 B2 * | 4/2004 | Baloche | 297/367 R |
| 6,755,470 B2 * | 6/2004 | Iwata et al. | 297/362 |
| 6,805,650 B2 * | 10/2004 | Branov et al. | 475/162 |
| 6,820,937 B1 * | 11/2004 | Esaki et al. | 297/366 |
| 7,455,361 B2 * | 11/2008 | Stemmer et al. | 297/362 |
| 7,497,519 B2 * | 3/2009 | Dill et al. | 297/362 |
| 7,611,436 B2 * | 11/2009 | Ito | 475/180 |
| 7,789,464 B2 * | 9/2010 | Stemmer et al. | 297/362 |
| 8,016,356 B2 * | 9/2011 | Mitsuhashi et al. | 297/366 |
| 8,052,215 B2 * | 11/2011 | Ito | 297/362.11 |
| 8,152,241 B2 * | 4/2012 | Krueger et al. | 297/367 R |
| 2003/0080599 A1 * | 5/2003 | Hohn et al. | 297/362 |
| 2003/0098599 A1 | 5/2003 | Baloche | |
| 2005/0059524 A1 * | 3/2005 | Hori et al. | 475/180 |
| 2006/0025270 A1 * | 2/2006 | van de Geer et al. | 475/162 |
| 2006/0084547 A1 * | 4/2006 | Dill et al. | 475/162 |
| 2006/0145522 A1 | 7/2006 | Yamada | |
| 2007/0032332 A1 * | 2/2007 | Ito | 475/177 |
| 2007/0200408 A1 * | 8/2007 | Ohta et al. | 297/362.11 |
| 2009/0256409 A1 | 10/2009 | Kuroda et al. | |
| 2009/0301247 A1 * | 12/2009 | Mitsuhashi et al. | 74/466 |

FOREIGN PATENT DOCUMENTS

| | | | |
|---|---|---|---|
| JP | 2003-180477 | | 7/2003 |
| JP | 2004-290243 | | 10/2004 |
| JP | 2005-83535 | | 3/2005 |
| JP | 2005-230116 | | 9/2005 |
| WO | WO 2005/025930 | * | 3/2005 |

OTHER PUBLICATIONS

English language Abstract of JP 2003-180477, Jul. 2, 2003.
English language Abstract of JP 2005-83535, Mar. 31, 2005.
English language Abstract of JP 2004-290243, Oct. 21, 2004.
English language Abstract of JP 2002-34697, Feb. 5, 2002.
English language Abstract of JP 2003-507101, Feb. 25, 2003.

* cited by examiner

ROTATION MECHANISM

TECHNICAL FIELD

The present invention relates to a rotation mechanism. More particularly, the present invention relates to a rotation mechanism in which two connection devices relatively rotatably connecting two subject components are axially oppositely disposed such that the subject components can be coaxially rotated.

BACKGROUND ART

Conventionally, a structure of a vehicle seat is known. In the structure, reclining devices that are capable of adjusting a tilt angle of a seat back are disposed on the vehicle seat. Japanese Laid-Open Patent Publication Number 2002-34697 teaches a structure in which reclining devices connecting a seat back and a seat cushion are disposed on both sides of a vehicle seat. In this structure, a belt retracting port of a seatbelt device is formed in a shoulder portion of the seat back in one side of the vehicle seat.

Further, in the side of the vehicle seat in which the belt retracting port is positioned, the seat back and the seat cushion are connected via the two reclining devices described above that are laterally juxtaposed to each other. Thus, a connection strength between the seat back and the seat cushion can be increased in the side of the vehicle.

However, in the conventional technique described above, the number of the parts and the assembling processes can be increased because the two reclining devices are laterally juxtaposed to each other in one side of the vehicle seat. Therefore, in order to increase the connection strength, for example, a single large reclining device can be used instead of the two reclining devices in one side of the vehicle seat in which the connection strength between the seat back and the seat cushion must be increased. However, as shown in Japanese Laid-Open Patent Publication Number 2003-507101, when each of the reclining devices has an eccentric mechanism in which an external gear wheel revolves along a toothed inner circumferential surface of an internal gear wheel while changing a meshing position therebetween, if one of the reclining devices is simply increased in size, the revolving motion of the external gear wheel of one of the reclining devices can be performed in behavior that is different from the other of the reclining devices.

Thus, there is a need in the art to increase a connection strength of one of the conventional connection devices that relatively rotatably connect a pair of subject components, such as one of the reclining devices described above.

SUMMARY OF THE INVENTION

In a rotation mechanism of the present invention, two connection devices relatively rotatably connecting two subject components are axially oppositely disposed such that the subject components can be coaxially rotated. Each of the connection devices includes an internal gear wheel connected to one of the two subject components and having inwardly-faced teeth that are formed in an inner circular circumferential surface thereof, and an external gear wheel connected to the other of the two subject components and having outwardly-faced teeth that are formed in an outer circular circumferential surface thereof. The outwardly-faced teeth is capable of meshing with the inwardly-faced teeth. The external gear wheel of each of the connection devices has a diameter smaller than the internal gear wheel thereof and has a teeth number different from the internal gear wheel. Relative rotational motion of the two subject components can be performed by rotational displacement of the external gear wheel due to the different teeth number when the external gear wheel meshing with the internal gear wheel relatively revolves along the inner circumferential toothed surface of the internal gear wheel while changing a meshing position therebetween. Each of the connection devices is formed so as to have a different size. The internal gear wheels and the external gear wheels of the connection devices respectively have the same teeth number as each other. Further, the internal gear wheels and the external gear wheels of the connection devices are formed such that distances between centers thereof are equal to each other. A meshing line of the internal gear wheel and the external gear wheel of at least the larger of the connection devices is formed between two curves defining a meshing range and is drawn as a line that extends from a side of a radially inwardly positioned curve in a circumferential direction in which the two curves are gradually spaced from each other and reaches to a side of a radially outwardly positioned curve.

According to the structure of the present invention, compared with, for example, a structure in which a meshing line of an internal gear wheel and an external gear wheel of a connection device is formed between two curves defining a meshing range and is drawn as a line that extends from a point on a radially outwardly positioned curve in a circumferential direction in which the two curves are gradually spaced from each other and intersects with a radially inwardly positioned curve, the meshing line of the internal gear wheel and the external gear wheel of at least the larger of the connection devices can be prolonged within the meshing range. As a result, a meshing ratio in at least the larger of the connection devices can be increased. Further, the internal gear wheels and the external gear wheels of the connection devices respectively have the same teeth number as each other, and the internal gear wheels and the external gear wheels of the connection devices are formed such that distances between centers thereof are equal to each other. Therefore, even if the meshing line of the internal gear wheel and the external gear wheel of at least the larger of the connection devices is determined described above, both of the connection devices can be formed so as to have tooth profiles that permit the connection devices to rotate in the same behavior as each other. Thus, even if the tooth profiles of at least one of the connection devices are enlarged to increase a connection strength thereof, both of the connection devices can cooperate to each other so as to be rotated in the same behavior as each other.

Further, a meshing line of the internal gear wheel and the external gear wheel of each of the connection devices can be formed between two curves defining a meshing range and be drawn as a line that extends from a side of a radially inwardly positioned curve in a circumferential direction in which the two curves are gradually spaced from each other and reaches to a side of a radially outwardly positioned curve. According to this structure, the meshing line of each of the connection devices can be prolonged, so as to increase the connection strength of each of the connection devices.

Further, the meshing line of the internal gear wheel and the external gear wheel of at least the larger of the connection devices can be drawn as a spiral meshing line. Further, the term "spiral" may include a spiral line that is composed of curves and a polygonal line that is approximate to a spiral line. According to this structure, because the meshing line in at least the larger of the connection devices is spiral, the meshing line that can be drawn within the restricted meshing range can be further prolonged. Thus, the meshing ratio of the larger of the connection devices can be increased, so as to further increase the connection strength thereof.

Further, each of the connection devices is constructed as a reclining device that rotatably connects a seat back of a vehicle seat to a seat cushion such that a tilting angle of the seat back can be adjusted. According to this structure, each of the connection devices is used as the reclining device for adjusting the tilting angle of the seat back. Therefore, the tilting angle of the seat back can be reliably adjusted. In addition, the connection strength between each of the connection devices and seat cushion can be increased.

BEST MODE FOR CARRYING OUT THE INVENTION

In the following, best modes for carrying out the present invention will be described with reference to the drawings.

Embodiment 1

Figure 1:
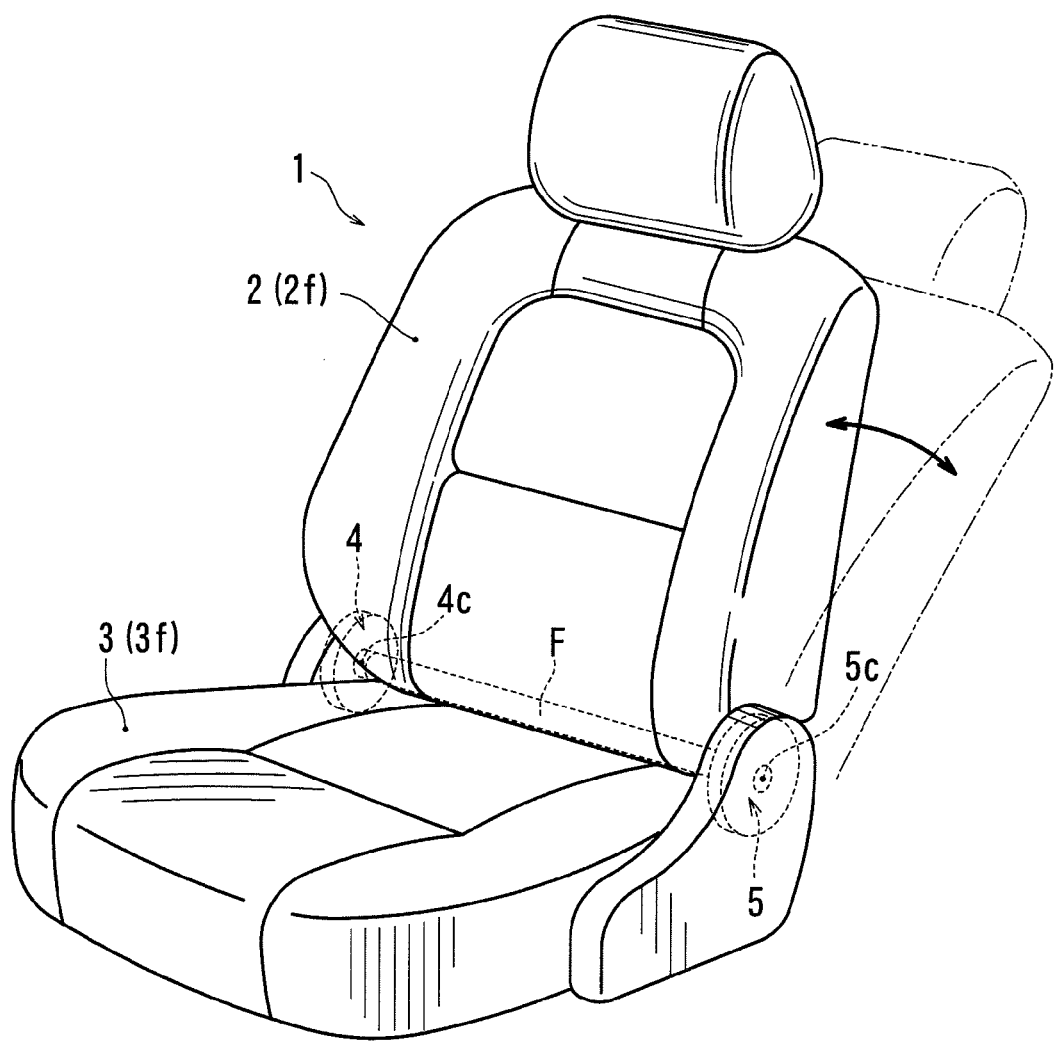
FIG. 1 is an external perspective view of a vehicle seat according to Embodiment 1.

First, a rotation mechanism of Embodiment 1 will be described with reference to FIGS. 1 to 14. FIG. 1 schematically shows a structure of a vehicle seat 1 having reclining devices 4 and 5 that correspond to connecting devices of the present invention. In the vehicle seat 1, a seat back 2 is connected to a seat cushion 3 via a pair of reclining devices 4 and 5 that are disposed on both side lower portions of the seat back 2.

Each of the reclining devices 4 and 5 is normally maintained in a condition in which a tilting angle of the seat back 2 is fixed. However, each of the reclining devices 4 and 5 is constructed to adjust the tilting angle of the seat back 2 when operating shafts 4c and 5c inserted thereinto are rotated. The operating shafts 4c and 5c are integrally connected to each other via a connection rod F, so as to be synchronously rotated when an electric motor (not shown) connected to the operating shaft 4c (or the operating shaft 5c) is actuated.

Further, the electric motor (not shown) is constructed to be turned on and off and to be switched between normal and reverse rotational modes by operating a switch that is attached to, for example, a side portion of the vehicle seat 1. When the reclining devices 4 and 5 are positioned in conditions in which the operating shafts 4c and 5c are not rotated, the reclining devices 4 and 5 are maintained in conditions in which the tilting angle of the seat back 2 is fixed to a desired angle. To the contrary, when the operating shafts 4c and 5c are rotationally moved by actuation of the electric motor, the reclining devices 4 and 5 are operated in conjunction with the motion, so as to change the tilting angle of the seat back 2.

Next, structures of the reclining devices 4 and 5 will be described. Further, the reclining devices 4 and 5 respectively have the substantially same basic construction as each other. However, the reclining device 5 shown in the right side is formed to be larger than the reclining device 4 shown in the opposite side. Thus, a connection strength between the seat back 2 and the seat cushion 3 can be increased in the right side.

In the vehicle seat 1 of the present embodiment, the larger reclining device 5 is attached to the right side of the seat back 2. Further, although not shown in the drawings, a belt retracting port of a seatbelt device for restraining a sitting person is formed in a right shoulder portion of the seat back 2. Therefore, a tensile force of the seatbelt can be applied to the right shoulder portion of the seat back 2 when the sitting person is restrained. As a result, the seat back 2 can be applied with a twisting load caused by the tensile force. However, the twisting load can be reliably resisted by the connection strength of the larger reclining device 5 that is attached to the right side of the seat back 2

Figure 2:
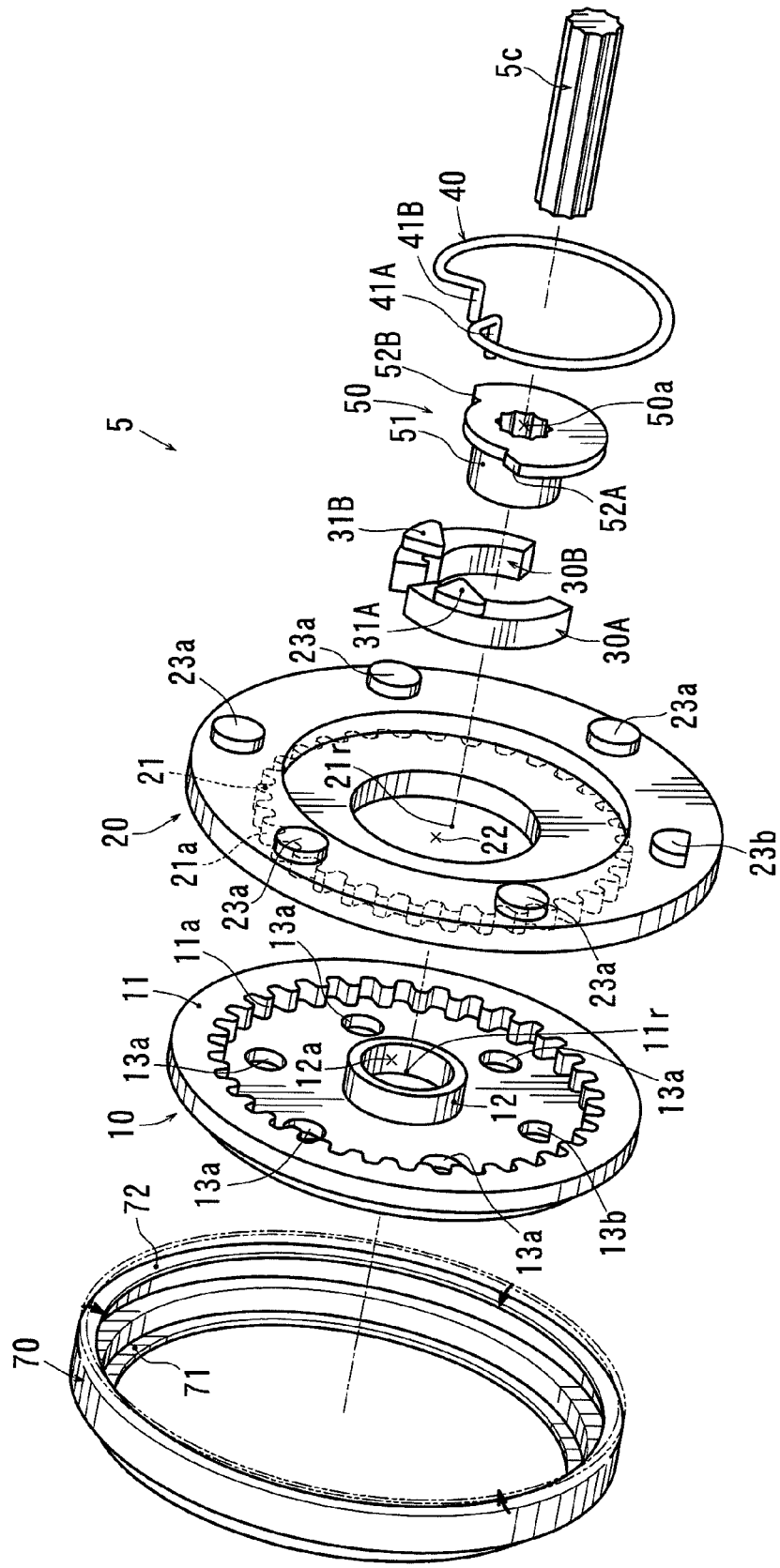
FIG. 2 is an exploded perspective view of a larger reclining device.

Further, as described above, the reclining devices 4 and 5 respectively have the substantially same basic construction as each other. Therefore, only the reclining device 5 shown in the right side will be described hereinafter. Further, structural components of the reclining device 5 are shown in FIG. 2 as an exploded perspective view. As shown in FIG. 2, the reclining device 5 includes a disk-shaped internal gear member 10, a disk-shaped external gear member 20, a pair of piece-shaped eccentric members 30A and 30B, an open ring-shaped spring member 40, a cylindrical operating member 50, a rod-like operating shaft 5c, and a thin cylindrical retainer member 70, which are assembled as a unit.

Figure 3:
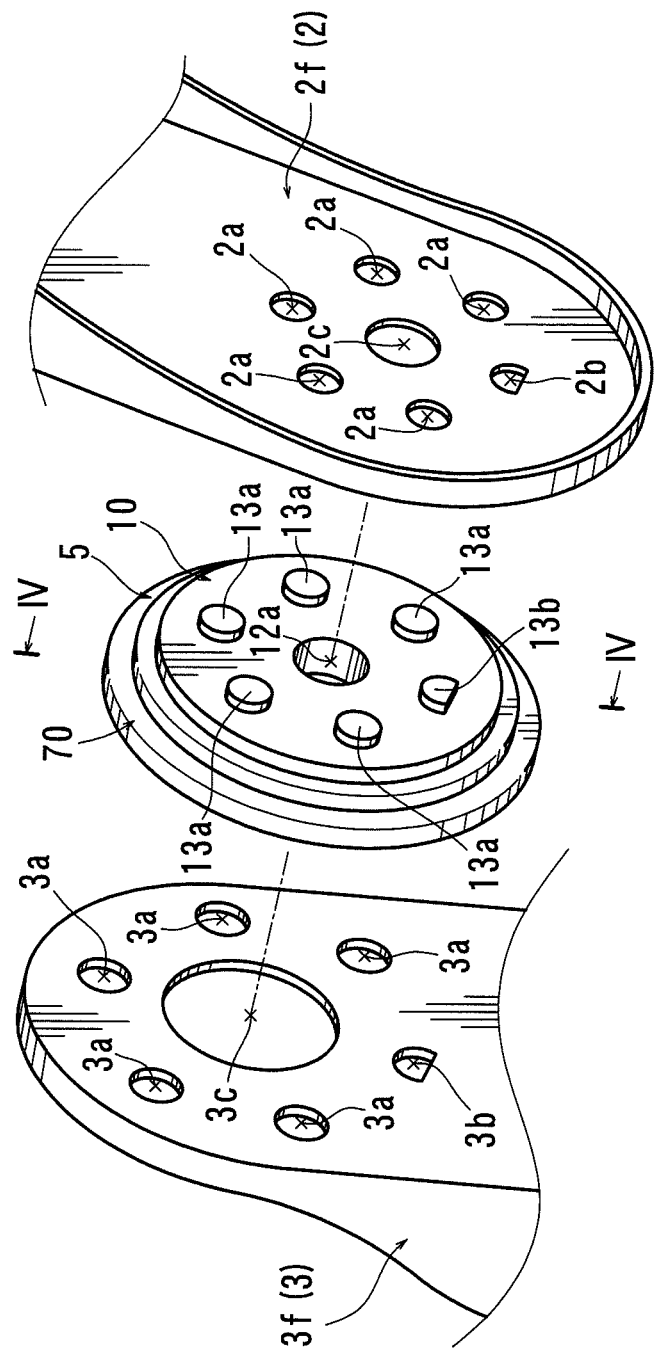
FIG. 3 is an exploded perspective view of the larger reclining device, which illustrates an assembled condition.

Further, these components are made of steel and are axially set in order after the internal gear member 10 is first introduced into the retainer member 70, so as to be assembled as a unit (FIG. 3). Structures of the components described above will be described in detail hereinafter with reference to FIG. 2.

First, a structure of the internal gear member 10 will be described. The disk-shaped internal gear member 10 is shaped by half die cutting the same in a thickness direction (an axial direction), so that an outer circumferential peripheral portion thereof can be cylindrically projected. The cylindrically projected portion includes inwardly-faced teeth 11a that are formed in an inner circumferential surface thereof. That is, the cylindrically projected portion is formed as an internal gear wheel 11. Further, the internal gear member 10 has a cylindrical portion 12 formed in a central portion thereof, so as to be projected in the same direction as the internal gear wheel 11.

The cylindrical portion 12 has a center that is aligned with a center 11r of the internal gear member 10 (the internal gear wheel 11). The cylindrical portion 12 has a circular shaft insertion bore 12a that is formed therethrough. As shown in FIG. 3, an outer disk surface of the internal gear member 10 is joined to a plate surface of a back frame 2f of the seat back 2, so that the internal gear member 10 is integrally affixed to the back frame 2f. Further, the back frame 2f corresponds to one of two subject components of the present invention.

Further, the internal gear member 10 has a plurality of circular dowels 13a. and a D-shaped dowel 13b that are respectively formed in a disk-shaped portion thereof so as to be projected from the outer disk surface thereof. (Symbol "." means plural number.) The dowels 13a. and the D-shaped dowel 13b are formed in positions closer to an outer circumferential periphery of the disk-shaped portion so as to be circumferentially positioned at equal intervals. Further, the D-shaped dowel 13b is formed by partly removing a circular dowel so as to have a D-shape in cross section. Therefore, the D-shaped dowel 13b can be distinguished from the circular dowels 13a. in shape.

Conversely, the back frame 2f has dowel insertion holes 2a. and a D-shaped dowel insertion hole 2b that are formed therethrough. The dowel insertion holes 2a. and D-shaped dowel insertion hole 2b are shaped such that the dowels 13a. and the D-shaped dowel 13b can be fitted thereinto. Therefore, the internal gear member 10 is securely integrally attached to the back frame 2f by fitting the dowels 13a. and the D-shaped dowel 13b to the dowel insertion holes 2a. and the D-shaped dowel insertion hole 2b formed in the back frame 2f and then welding fitted portions.

Further, the back frame 2f has a circular shaft insertion bore 2c that is formed therethrough in a thickness direction. The shaft insertion bore 2c is shaped to have the same diameter as the shaft insertion bore 12a formed in the internal gear member 10. The shaft insertion bores 12a and 2c are shaped such that the rod-like operating shaft 5c can be inserted thereinto, which will be described hereinafter.

Next, with reference to FIG. 2 again, a structure of the external gear member 20 will be described. The external gear member 20 is formed as a disk-shaped member having a diameter greater than the diameter of the internal gear member 10. The external gear member 20 is shaped by half die cutting the same in a thickness direction (an axial direction), so that a disk-shaped central portion thereof can be cylindrically projected. The cylindrically projected portion includes outwardly-faced teeth 21a that are formed in an outer circumferential surface thereof. The cylindrically projected portion is formed as an external gear wheel 21. Further, the external gear wheel 21 has a diameter smaller than the diameter of the internal gear wheel 11 formed in the internal gear member 10.

Therefore, when the external gear member 20 thus constructed is axially coupled to the internal gear member 10 while the external gear wheel 21 meshes with the internal gear wheel 11, the external gear member 20 and the internal gear member 10 can be assembled, so as to be rotated relative to each other while meshing with each other. Further, the external gear member 20 has an enlarged opening 22 having a diameter greater than the shaft insertion bore 12a formed in the central portion of the internal gear member 10 described above. The enlarged opening 22 is formed in the central portion of the external gear member 20. The enlarged opening 22 has an axis that is aligned with a center 21r of the external gear member 20 (the external gear wheel 21).

Figure 4:
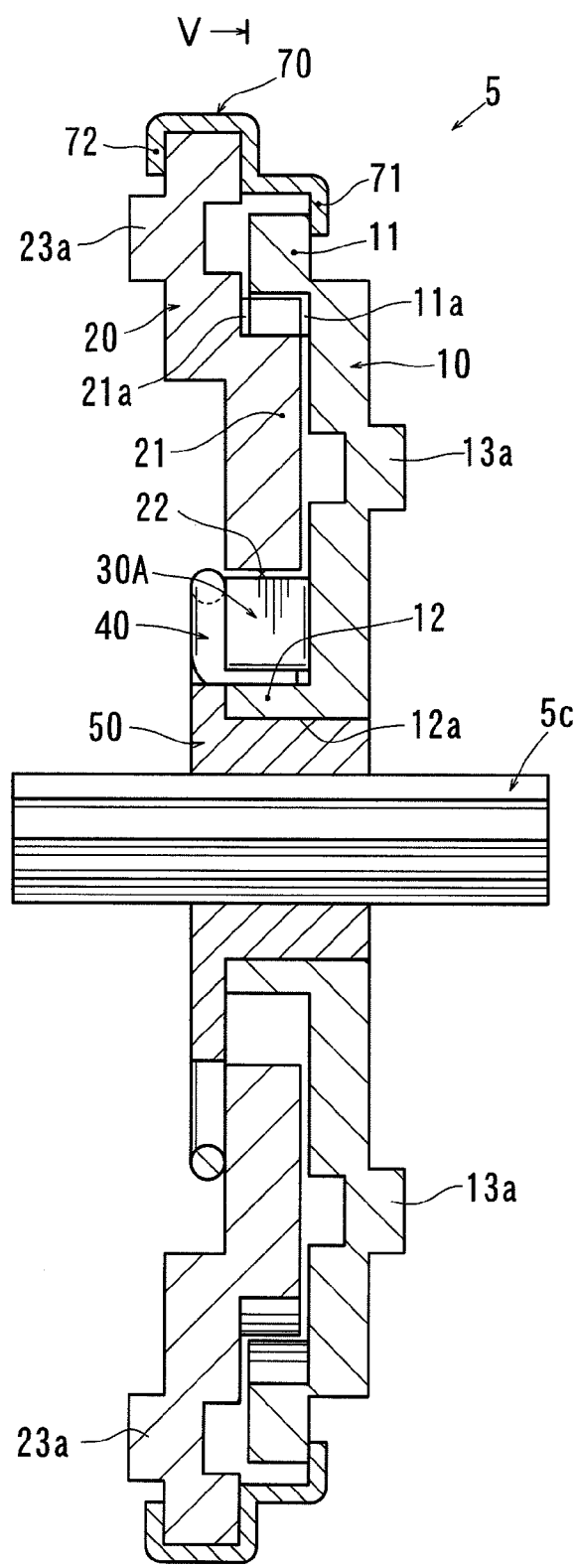
FIG. 4 is a cross-sectional view taken along line IV-IV in FIG. 3.
Figure 5:
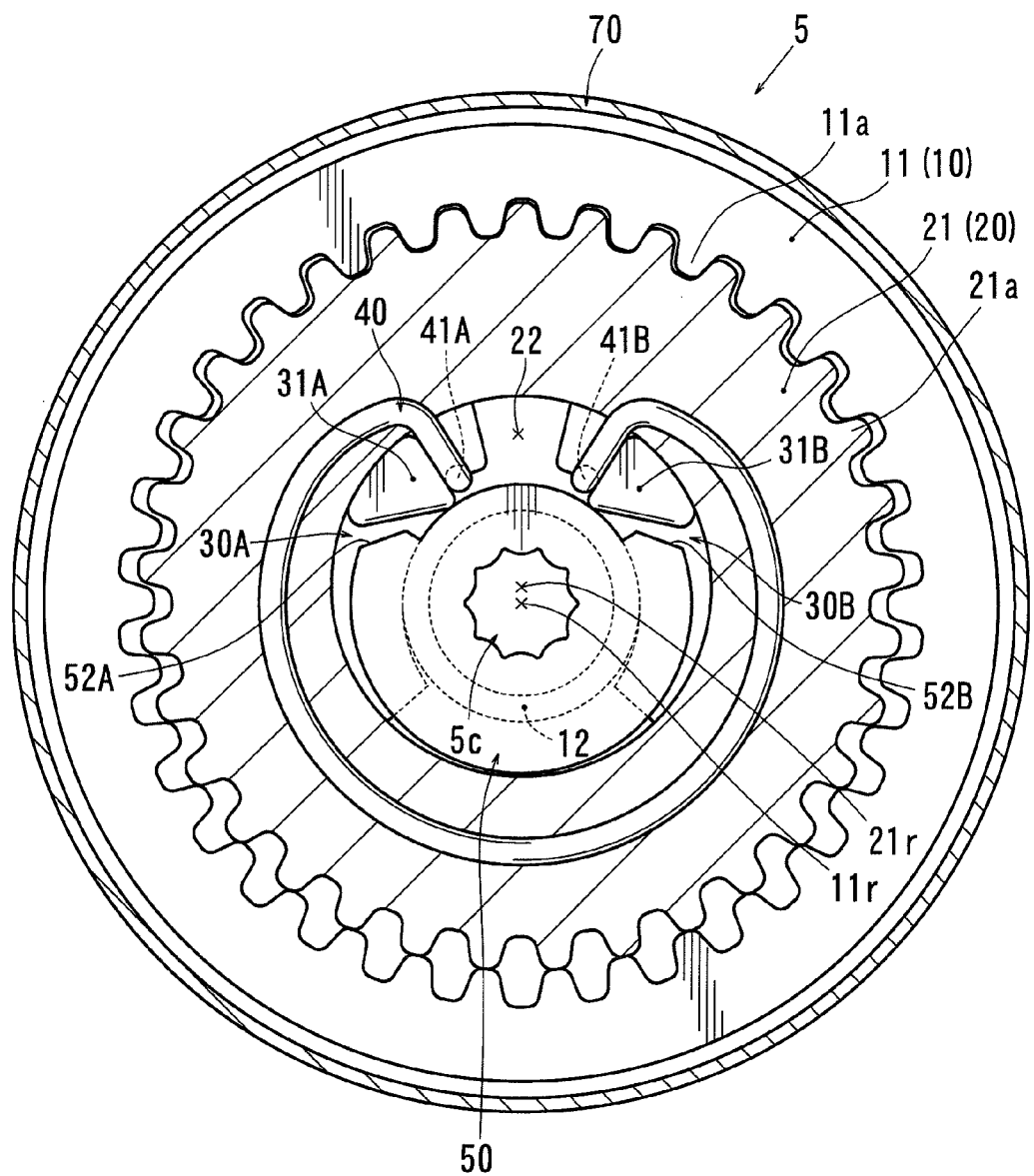
FIG. 5 is a cross-sectional view taken along line V-V in FIG. 4.
Figure 6:
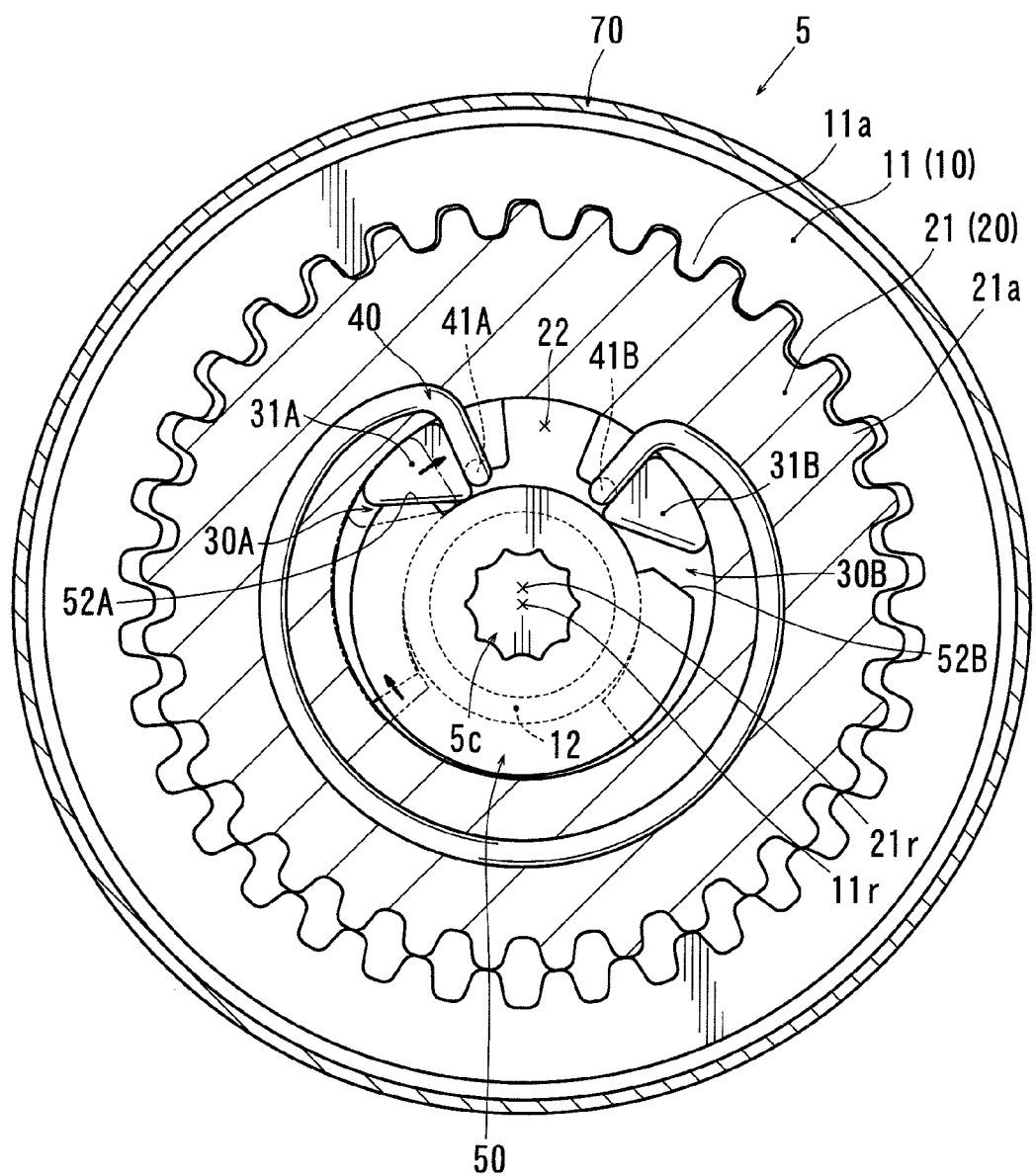
FIG. 6 is a cross-sectional view, which illustrates a condition in which the reclining device is in an operable condition.

Therefore, as shown in FIGS. 4 to 6, the external gear member 20 is coupled to the internal gear member 10 while the cylindrical portion 12 formed in the internal gear member 10 is positioned within the enlarged opening 22. Further, the external gear member 20 is coupled to the internal gear member 10 while the centers 21r and 11r thereof are offset from each other. Further, the external gear wheel 21 is constructed to have a teeth number fewer than the teeth number of the internal gear wheel 11. In particular, the teeth number of the outwardly-faced teeth 21a of the external gear wheel 21 is thirty three whereas the teeth number of the inwardly-faced teeth 11a of the internal gear wheel 11 is thirty four.

Therefore, as shown in FIG. 5, when relative revolving motion is performed between the external gear wheel 21 and the toothed inner circumferential surface of the internal gear wheel 11 while changing a meshing position therebetween, a rotational posture of the external gear member 20 relative to the internal gear member 10 can be gradually changed due to the different teeth number thereof. In particular, as shown in, for example, FIG. 6, when the external gear wheel 21 is revolved relatively clockwise along the inner circumferential surface of the internal gear wheel 11, the external gear member 20 can rotate (spin) counterclockwise relative to the internal gear member 10, so that the rotational posture thereof can be changed However, the internal gear member 10 is connected to the back frame 2f. Conversely, the external gear member 20 is connected to the cushion frame 3f, which will be described hereinafter with reference to FIG. 3. Therefore, actually, the internal gear member 10 can rotate relative to the external gear member 20 while changing the meshing position therebetween. As a result, when rotational motion between the external gear wheel 21 and the internal gear wheel 11 is performed described above, as shown in FIG. 1, the tilting angle of the seat back 2 can be adjusted. Further, tooth profiles of the internal gear wheel 11 and the external gear wheel 21 will be described in detail hereinafter.

Further, the external gear member 20 has a plurality of circular dowels 23a. and a D-shaped dowel 23b that are respectively formed in a disk-shaped portion thereof so as to be projected from the outer disk surface thereof. The dowels 23a. and the D-shaped dowel 23b are formed in positions closer to an outer circumferential periphery of the disk-shaped portion so as to be circumferentially positioned at equal intervals. Further, the D-shaped dowel 23b is formed by partly removing a circular dowel so as to have a D-shape in cross section. Therefore, the D-shaped dowel 23b can be distinguished from the circular dowels 23a. in shape.

Conversely, as shown in FIG. 3, the cushion frame 3f has dowel insertion holes 3a. and a D-shaped dowel insertion hole 3b that are formed therethrough. The dowel insertion holes 3a. and D-shaped dowel insertion hole 3b are shaped such that the dowels 23a. and the D-shaped dowel 23b (FIG. 2) can be fitted thereinto. Therefore, the external gear member 20 is securely integrally attached to the cushion frame 3f by fitting the dowels 23a. and the D-shaped dowel 23b to the dowel insertion holes 3a. and the D-shaped dowel insertion hole 3b formed in the cushion frame 3f and then welding fitted portions.

Further, the cushion frame 3f has a circular enlarged opening 3c that is formed therethrough in a thickness direction. The enlarged opening 3c is shaped to have the same diameter as the enlarged opening 22 formed in the external gear member 20 described above. The enlarged openings 22 and 3c are shaped such that the rod-like operating shaft 5c (FIG. 2) can be inserted thereinto, which will be described hereinafter. Further, the cushion frame 3f corresponds to the other of the two subject components of the present invention.

Next, with reference to FIG. 2 again, structures of the eccentric members 30A and 30B will be described. The eccentric members 30A and 30B are formed as arcuate piece-shaped members that are symmetrically curved. The eccentric members 30A and 30B are assembled while they are received in the enlarged opening 22 formed in the external gear member 20 described above. Thus, as shown in FIG. 5, the eccentric members 30A and 30B are disposed in an eccentric space that is formed between an inner circumferential surface of the enlarged opening 22 and an outer circumferential surface of the cylindrical portion 12 of the internal gear member 10 described above.

In particular, the eccentric members 30A and 30B are respectively arcuately tapered so as to be oppositely introduced into a narrowing space portion formed between the enlarged opening 22 of the external gear member 20 and the cylindrical portion 12 of the internal gear member 10 (a narrowing space portion positioned in a lower side in FIG. 5). Further, engagement end portions 41A and 41B of the open ring-shaped spring member 40 is attached to the eccentric members 30A and 30B while straddling the same. Therefore, the eccentric members 30A and 30B are constantly biased by a biasing force of the spring member 40, so as to be maintained in a condition in which tapered lower end portions thereof are oppositely introduced into the above-described narrowing space portion.

Thus, due to a spring force of the spring member 40, the external gear member 20 can normally be maintained in a condition in which it is upwardly biased with respect to the cylindrical portion 12 by the eccentric members 30A and 30B, so that the external gear wheel 21 is pressed to the internal gear wheel 11 without producing clearance (backrush) therebetween. Thus, due to a retention force thus produced, the external gear member 20 can be maintained in a condition (an unrotatable condition) in which the revolving motion previously described is prevented relative to the internal gear member 10.

However, the unrotatable condition that is obtained by the eccentric members 30A and 30B can be released by rotating the operating shaft 5c. In particular, as shown in FIG. 2, the cylindrical operating member 50 is axially attached and secured to the operating shaft 5c so as to be integrally rotated therewith. In particular, a serrated portion is axially formed in an outer circumferential surface of the operating shaft 5c. When the operating shaft 5c is inserted into a through insertion bore 50a that is formed in a cylindrical portion 51 of the operating member 50, the operating shaft 5c engages a serrated portion formed in an inner circumferential surface of an insertion bore 50a. As a result, the operating shaft 5c is secured to the operating member 50 so as to be integrally rotated therewith.

The operating member 50 connected to the operating shaft 5c has an annular collar portion that is formed in a cylindrical end portion thereof. The collar portion has shouldered portions or pressing portions 52A and 52B that are capable of pressing and rotating the eccentric members 30A and 30B previously described. As shown in FIG. 5, the pressing portions 52A and 52B are arranged so as to be positioned below axially projected projections 31A and 31B that are respectively formed in the eccentric members 30A and 30B.

Therefore, as shown in FIG. 6, when the operating member 50 is rotated, for example, clockwise in the drawing, the pressing portions 52A and 52B press the projection 31A of the left eccentric member 30A from below, so as to rotate the left eccentric member 30A clockwise along the inner circumferential surface of the enlarged opening 22. Upon rotational movement of the eccentric member 30A, the inner circumferential surface of the enlarged opening 22 is pressed, so that the external gear wheel 21 can revolve clockwise along the inner circumferential surface of the internal gear wheel 11 while changing the meshing position therebetween.

Depending on this motion, the right eccentric member 30B can be rotationally moved clockwise due to the biasing force of the spring member 40 while it is introduced into the space portion that is widened due to the movement described above. Depending on the movement, as previously described with reference to FIG. 1, the seat back 2 can be rotated in a forward or backward tilting direction.

Further, as shown in FIG. 5, when rotational operation of the operating shaft 5c is stopped, the eccentric members 30A and 30B are placed again in the condition in which they are introduced into the narrowing space portion by the biasing force of the spring member 40, so that the reclining device 5 can be returned to the condition in which it is prevented from rotating.

Next, with reference to FIG. 1 again, the retainer member 70 will be described. The retainer member 70 is formed by stamping a thin steel sheet so as to have a ring shape. Further, the retainer member 70 is cylindrically shaped by axially half die cutting the same and has a flange-shaped support wall 71. The support wall 71 is formed in a left back side end of the retainer member 70 and has an axial surface. The retainer member 70 is constructed such that when a right front side end thereof is bent radially inwardly and crimped after the internal and external gear members 10 and 20 described above are incorporated into the cylindrical portion of the retainer member 70, a flange-shaped support wall 72 having an axial surface facing the outer disk surface of the external gear member 20 is formed.

Thus, the internal and external gear members 10 and 20 are assembled via the support walls 71 and 72, so as to be prevented from being axially separated from each other. At this time, small clearances are formed between the outer disk surface of the internal gear member 10 and the support wall 71, so that the internal and external gear members 10 and 20 cannot be prevented from rotating relative to each other.

Figure 7:
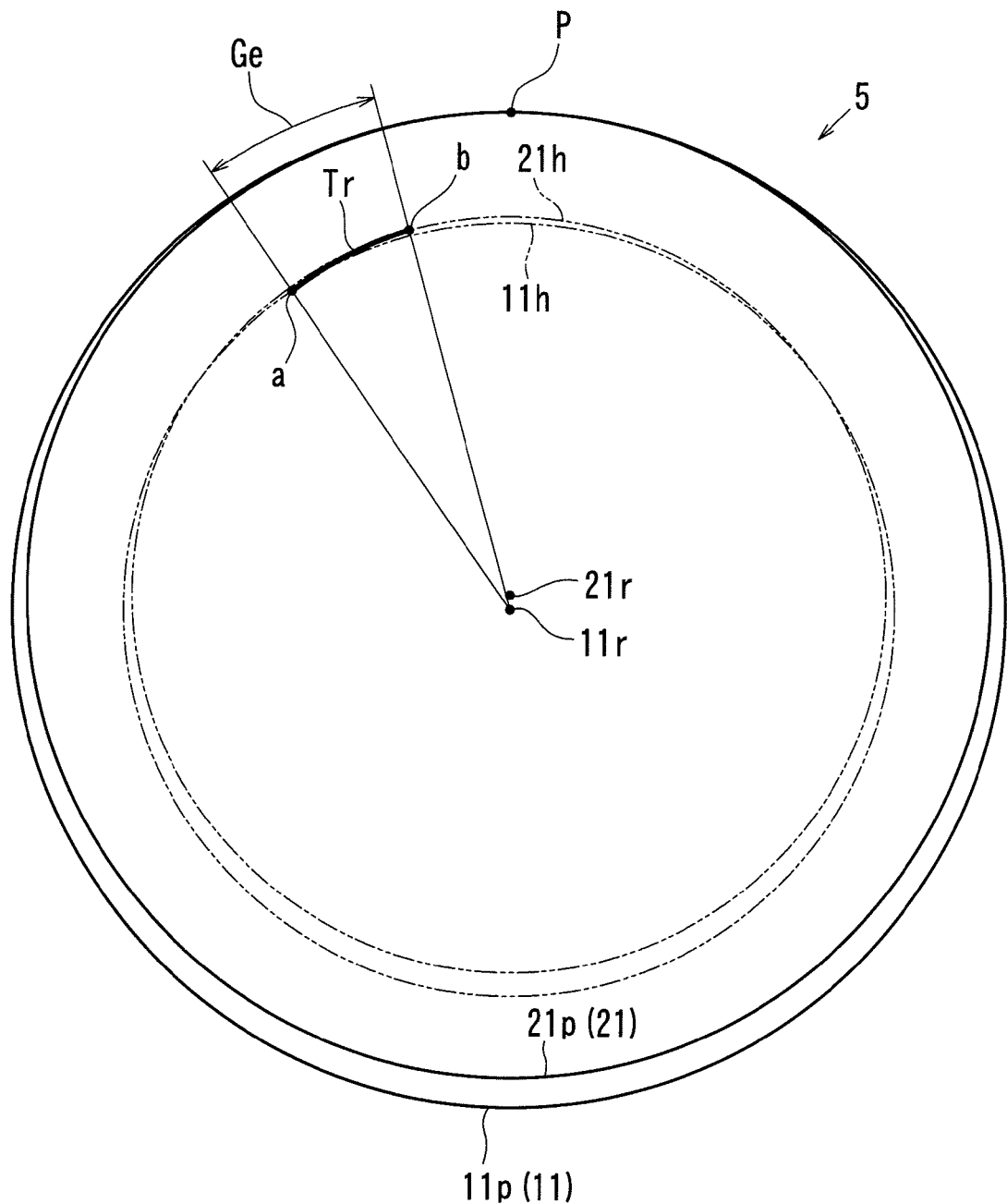
FIG. 7 is an explanatory view which illustrates a relation between a meshing line of internal and external gear wheels of the larger reclining device and two curves defining a meshing range.

Next, the tooth profiles of the internal gear wheel 11 and the external gear wheel 21 of the reclining device 5 will be described with reference to FIGS. 7 to 10. FIG. 7 shows a pitch circle 11p of the internal gear wheel 11, a pitch circle 21p of the external gear wheel 21 and a meshing line Tr that is drawn as a trajectory of contacting points of the teeth (the inwardly-faced teeth 11a and the outwardly-faced teeth 21a) of the internal and external gear wheels 11 and 21. As shown in FIG. 7, in the embodiment, the meshing line Tr of the internal and external gear wheels 11 and 21 is determined so as to have a helical shape. The tooth profiles of the inwardly-faced teeth 11a and the outwardly-faced teeth 21a are respectively determined using the helical meshing line Tr. Processes of determining the tooth profiles are as follows.

First, a method of determining the tooth profile of the inwardly-faced teeth 11a will be described. Two circles shown by solid lines in FIG. 7 respectively correspond to the pitch circles 11p and 21p of the internal gear wheel 11 and the external gear wheel 21. Each of diameters of the pitch circles 11p and 21p is determined as the product of the teeth number of the gear wheels (the teeth number of the internal gear wheel 11: 34; the teeth number of the external gear wheel 21: 33) and a module (2.6). In particular, the diameter of the pitch circle 11p of the internal gear wheel 11 is set to 88.4 mm. Conversely, the diameter of the pitch circle 21p of the external gear wheel 21 is set to 85.8 mm.

The pitch circles 11p and 21p described above contact each other at an intersection point P shown in FIG. 7. A distance between the centers 11r and 21r thereof is 1.3 mm because of a geometrical relation described above. Further, the meshing line Tr previously described is arbitrarily defined by a spiral of Archimedes, so as to have a shape shown in FIG. 7. A range (a meshing range Ge) within which the meshing line Tr is drawn is determined as a circumferential range that is defined between a point (an intersection point a) in which the meshing line Tr intersects with an effective addendum circle 11h of the internal gear wheel 11 described below that is radially inwardly positioned and a point (an intersection point b) in which the meshing line Tr intersects with an effective addendum circle 21h of the external gear wheel 21 that is radially outwardly positioned.

Figure 9:
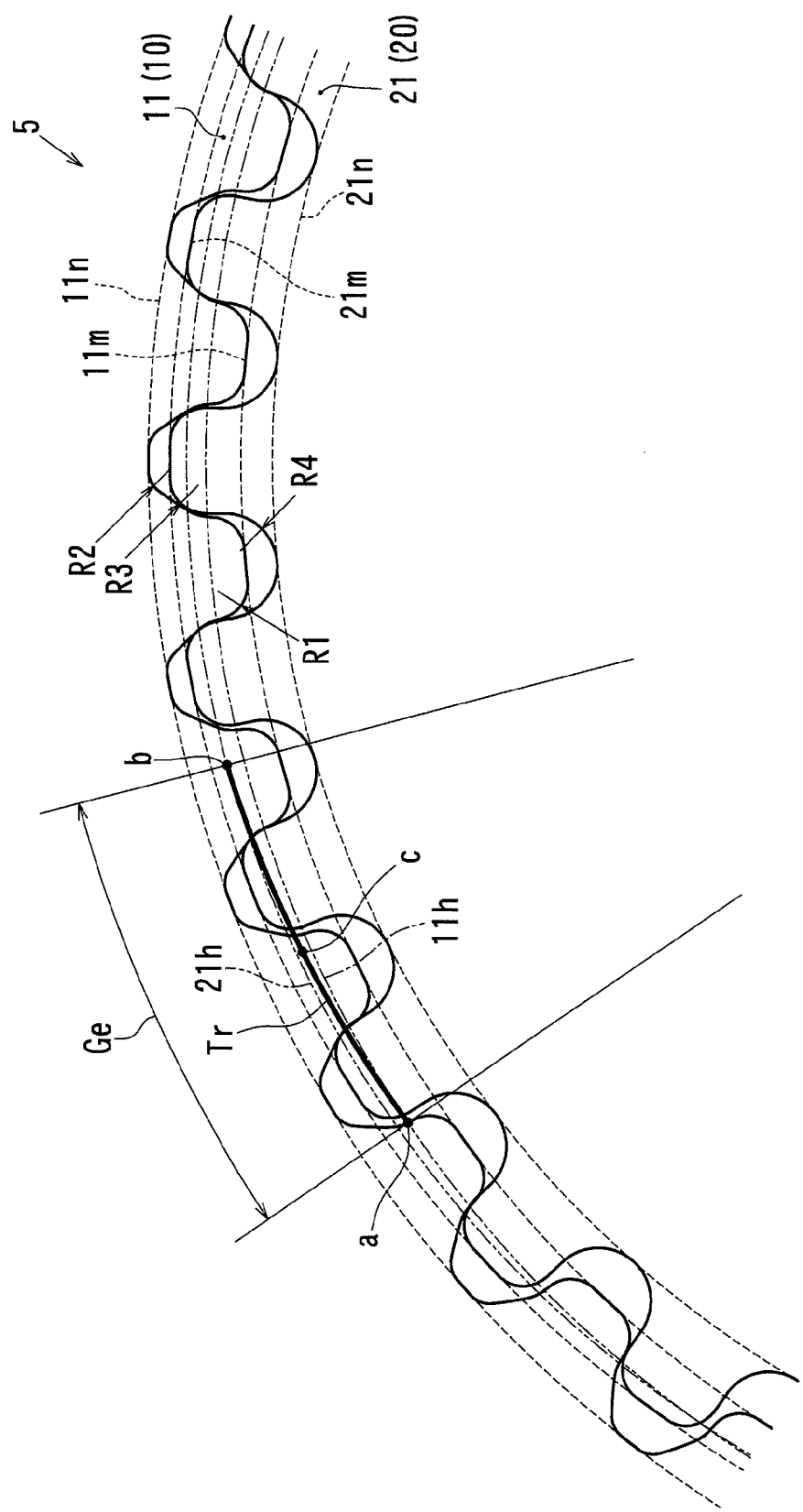
FIG. 9 is a partially enlarged view which illustrates determined tooth profiles of the internal and external gear wheels of the larger reclining device.

In particular, the meshing line Tr is drawn as a spiral that extends from a point on the radially inwardly positioned effective addendum circle 11h defining the meshing range in a circumferential direction (clockwise) in which the effective addendum circles 11h and 21h are gradually spaced from each other and intersects with the radially outwardly positioned effective addendum circle 21h. For more detail, as shown in FIG. 9, the meshing line Tr is drawn as a curve passing through a point (a pass point c) that is positioned closer to the outer effective addendum circle 21h than the inner effective addendum circle 11h in a circumferential mid section between the intersection point a in which the meshing line Tr intersects with the radially inwardly positioned effective addendum circle 11h and the intersection point b in which the meshing line Tr intersects with the radially outwardly positioned effective addendum circle 21h.

Figure 8:
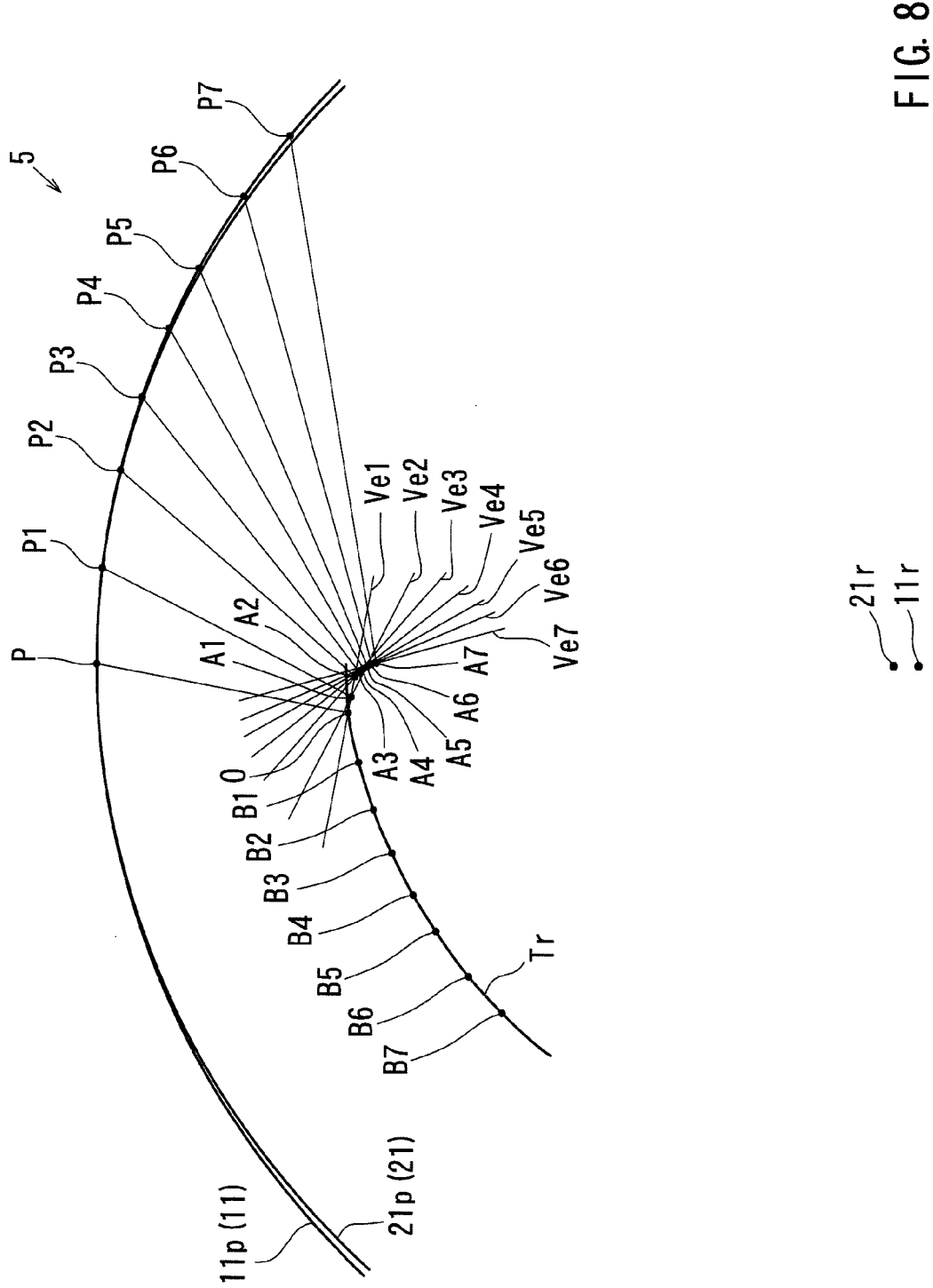
FIG. 8 is an explanatory view which illustrates a method to determine a tooth profile of the internal gear wheel.

First, in order to determine the tooth profile of the internal gear wheel 11, as shown in FIG. 8, a reference point O is determined on the meshing line Tr. Further, several points B1, B2, B3 are determined on the meshing line Tr at desired intervals so as to be gradually distanced from the reference point O in order. Further, in FIG. 8, the meshing line Tr is shown longer than it really is. Thereafter, a normal line Ve1 of a line segment P-O is drawn so as to pass through the reference point O. Next, the point B1 and the point P are respectively rotated clockwise about the center 11r of the internal gear wheel 11 without changing a relative positional relation among the center 11r, the point B1 and the point P. When the point B1 intersects with the normal line Ve1 due to the rotation, an intersection point thereof is determined as a point A1. Further, a shifted position of the point P is determined as a point P1.

Subsequently, a normal line Ve2 of a line segment P1-A1 is drawn so as to pass through the point A1. Next, the point B2 and the point P are respectively rotated clockwise about the center 11r of the internal gear wheel 11 without changing a relative positional relation among the center 11r, the point B2 and the point P. When the point B2 intersects with the normal line Ve2 due to the rotation, an intersection point thereof is determined as a point A2. Further, a shifted position of the point P is determined as a point P2.

Similarly, a normal line Ve3 of a line segment P2-A2 is drawn so as to pass through the point A2. Next, the point B3 and the point P are respectively rotated clockwise about the center 11r of the internal gear wheel 11 without changing a relative positional relation among the center 11r, the point B3 and the point P. When the point B3 intersects with the normal line Ve3 due to the rotation, an intersection point thereof is determined as a point A3. Further, a sifted position of the point P is determined as a point P3.

Remaining points A4-A7 can be similarly determined. Thereafter, all of the points O, A1, A2, A3 thus obtained are connected as a smooth curve. The curve thus formed may form a portion of the tooth profile of the internal gear wheel 11. Similarly, the tooth profile of the external gear wheel 21 can be determined by moving the points determined on the meshing line Tr about the center 21r of the external gear wheel 21 in order. Further, the method of determining the tooth profiles based on a geometrical relation among the pitch circles 11p and 21p and the meshing line Tr is known. The method is disclosed in a publication document (Setsuo Fukunaga et al., Zusetsu Kikogaku, 1st Edition, Rikogakusha, Apr. 10, 1972, FIG. 10.2).

Therefore, as shown in FIG. 9, the tooth profiles of the internal gear wheel 11 and the external gear wheel 21 can be determined using the method described above. Further, curved portions (rounded portions) R1-R4 are formed in tooth tip portions and tooth root portions of the internal gear wheel 11 and the external gear wheel 21. Such curved portions are essential for press forming. In particular, the curved portions R1 defining the tooth tip portions of the internal gear wheel 11 are formed between an addendum circle 11m of the internal gear wheel 11 and the effective addendum circle 11h.

Conversely, the rounded portions R3 defining the tooth tip portions of the external gear wheel 21 are formed between an addendum circle 21m of the external gear wheel 21 and the effective addendum circle 21h. Further, the curved portions R2 defining the tooth root portions of the internal gear wheel 11 are formed between a dedendum circle 11n of the internal gear wheel 11 and an effective dedendum circle (not shown). Further, the curved portions R4 defining the tooth root portions of the external gear wheel 21 are formed between a dedendum circle 21n of the external gear wheel 21 and an effective dedendum circle (not shown). Also, in the larger reclining device 5, the dedendum circle 11n of the internal gear wheel 11 has a diameter of 72 mm.

The gear wheels 11 and 21 having the tooth profiles thus formed can mesh with each other at a position on the meshing line Tr described above. In the present embodiment, the meshing line Tr defined by the spiral of Archimedes is utilized. Therefore, in the meshing range Ge formed between the effective addendum circle 11h and the effective addendum circle 21h described above, a longer meshing line can be obtained. Thus, a meshing ratio of the gear wheels 11 and 21 of the larger reclining device 5 is set to 2.

Figure 10:
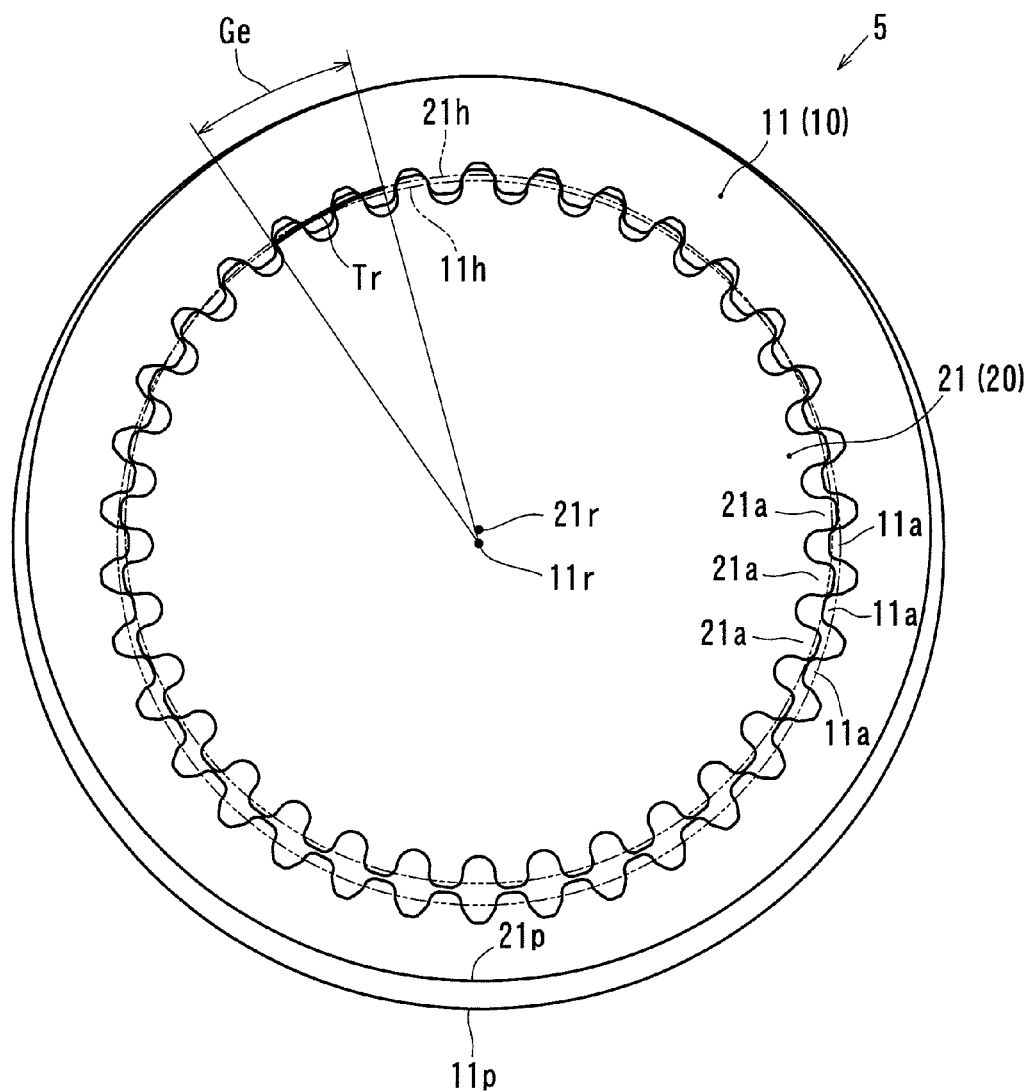
FIG. 10 is a view which illustrates the whole tooth profiles of the internal and external gear wheels of the larger reclining device.
Figure 11:
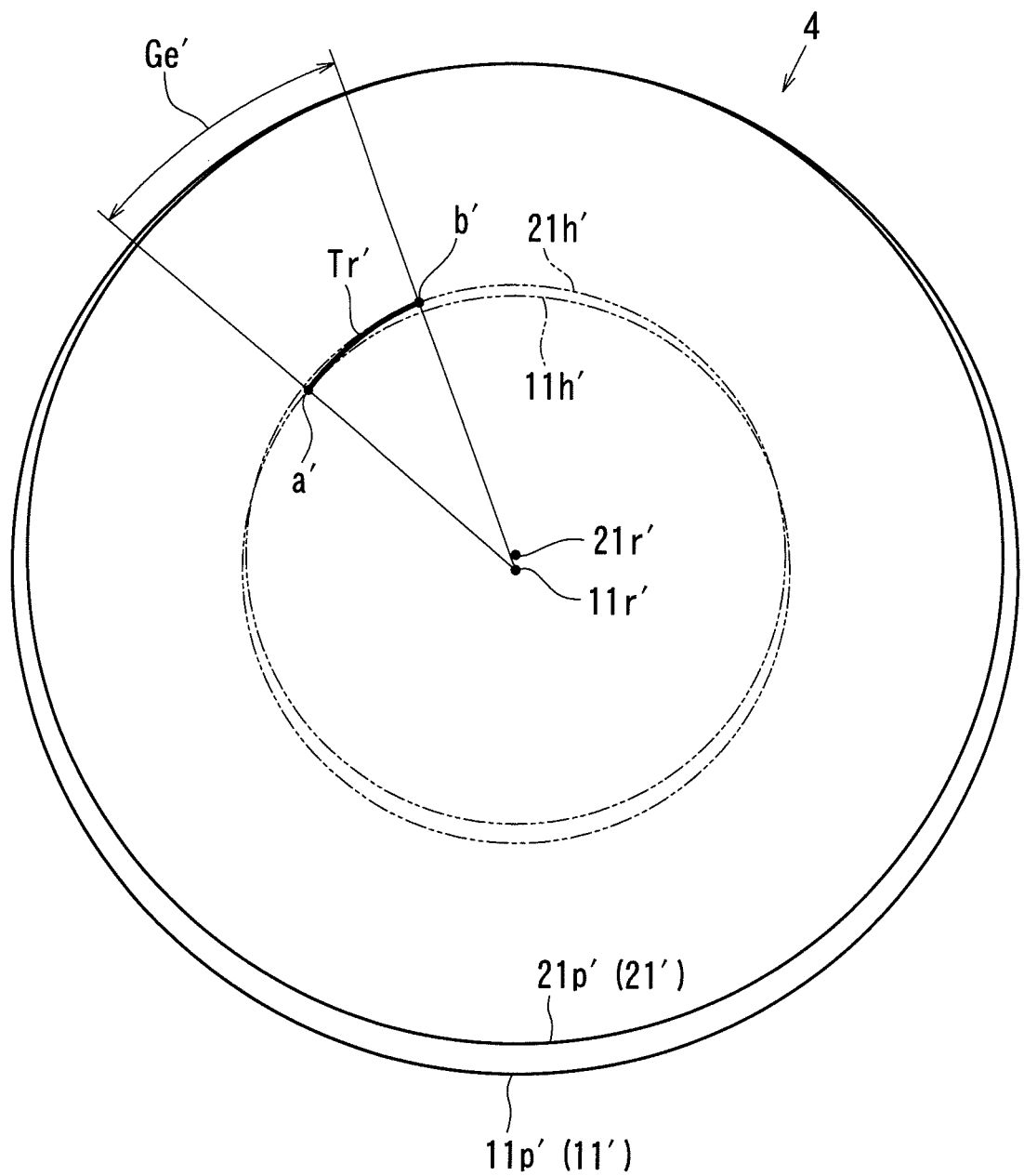
FIG. 11 is an explanatory view which illustrates a relation between a meshing line of internal and external gear wheels of a smaller reclining device and two curves defining a meshing range.

Further, the meshing ratio described above is a value that is obtained by dividing a length of the meshing line Tr by a normal pitch. The gear wheels 11 and 21 having a higher value of the meshing ratio may have a higher meshing strength. As a result, the reclining device 5 can have an increased connection strength. Further, FIG. 10 shows the whole tooth profiles of the gear wheels 11 and 21 of the reclining device 5 that are formed using the method described above Next, tooth profiles of an internal gear wheel 11' and an external gear wheel 21' of the smaller reclining device 4 that is shown in the left side in FIG. 1 will be described with reference to FIGS. 11 to 12. Further, the tooth profiles of the gear wheels 11' and 21' can be determined using the same method as the method for determining the tooth profiles of the gear wheels 11 and 21 of the larger reclining device 5, which method is described with reference to FIGS. 7 to 10. That is, as shown in FIG. 11, a meshing line Tr' of the gear wheels 11' and 21' is arbitrarily defined by a spiral of Archimedes, so as to have a shape shown therein.

Figure 12:
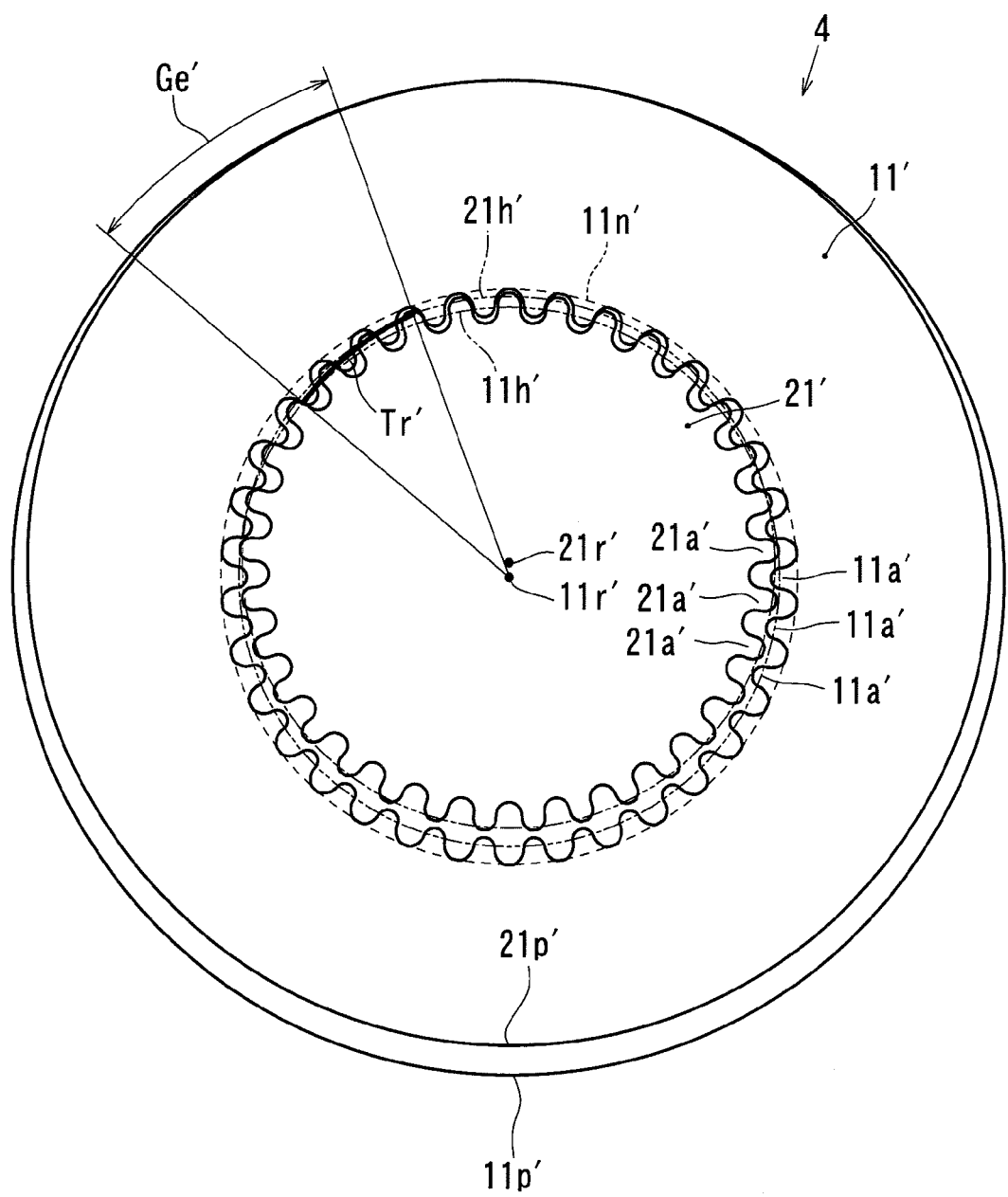
FIG. 12 is a view which illustrates whole tooth profiles of the internal and external gear wheels of the smaller reclining device.

A range (a meshing range Ge') within which the meshing line Tr' is drawn is determined as a circumferential range that is defined between a point (an intersection point a') in which the meshing line Tr' intersects with an effective addendum circle $11h'$ of the internal gear wheel $11'$ that is radially inwardly positioned and a point (an intersection point b') in which the meshing line Tr' intersects with an effective addendum circle $21h'$ of the external gear wheel $21'$ that is radially outwardly positioned. Further, as shown in FIG. 12, the gear wheels $11'$ and $21'$ have the same teeth number (the teeth number of the internal gear wheel $11'$: 34; the teeth number of the external gear wheel $21'$: 33) as the gear wheels of the larger reclining device 5.

Further, similar to the larger reclining device 5, a module of each of the gear wheels $11'$ and $21'$ is set to 2.6. As a result, similar to the larger reclining device 5, a diameter of a pitch circle $11p'$ of the internal gear wheel $11'$ is set to 88.4 mm. Conversely, a diameter of a pitch circle $21p'$ of the external gear wheel $21'$ is set to 85.8 mm. Further, a distance between centers $11r$ and $21r'$ of the pitch circles $11p'$ and $21p'$ is set to 1.3 mm that is equal to the distance between the centers $11r$ and $21r$ in the larger reclining device 5.

Further, in the smaller reclining device 4, sizes of the effective addendum circle $11h'$ of the internal gear wheel $11'$ and the effective addendum circle $21h'$ of the external gear wheel $21'$ are determined such that a dedendum circle $11n'$ of the internal gear wheel $11'$ has a diameter of 51.2 mm. Therefore, the tooth profiles of the gear wheels $11'$ and $21'$ shown in FIG. 12 can be determined using the method that is described with reference to FIG. 8. Thus, in the smaller reclining device 4, a meshing ratio is set to 3.

Figure 13:
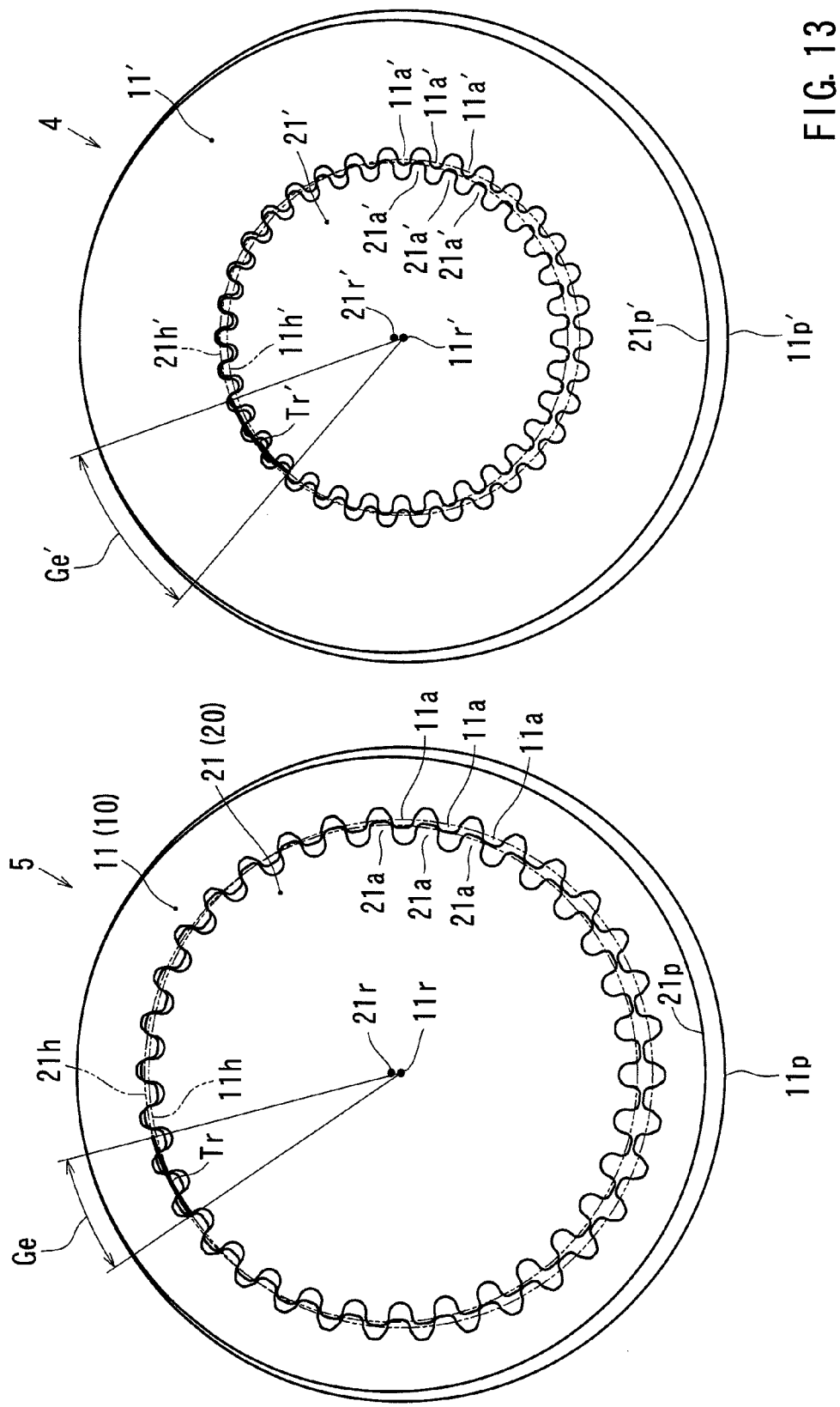
FIG. 13 is a view which illustrates a difference between the tooth profiles of the internal and external gear wheels of the larger and smaller reclining devices.

As contrastively shown in FIG. 13, the smaller reclining device 4 having the tooth profiles that are determined as described above is identical to the larger reclining device 5 with regard to the diameters of the pitch circles $11p'$ and $21p'$, the teeth number and the distance between the centers $11r'$ and $21r'$. As a result, the smaller reclining device 4 can rotate in the same behavior as the larger reclining device 5. Therefore, due to cooperating motion of the reclining devices 4 and 5 of which the size and the shape are different from each other, an adjusting operation (a rotating operation) of the tilting angle of the seat back 2 can be performed while both sides of the seat back 2 are well-balanced and synchronized with each other.

Figure 14:
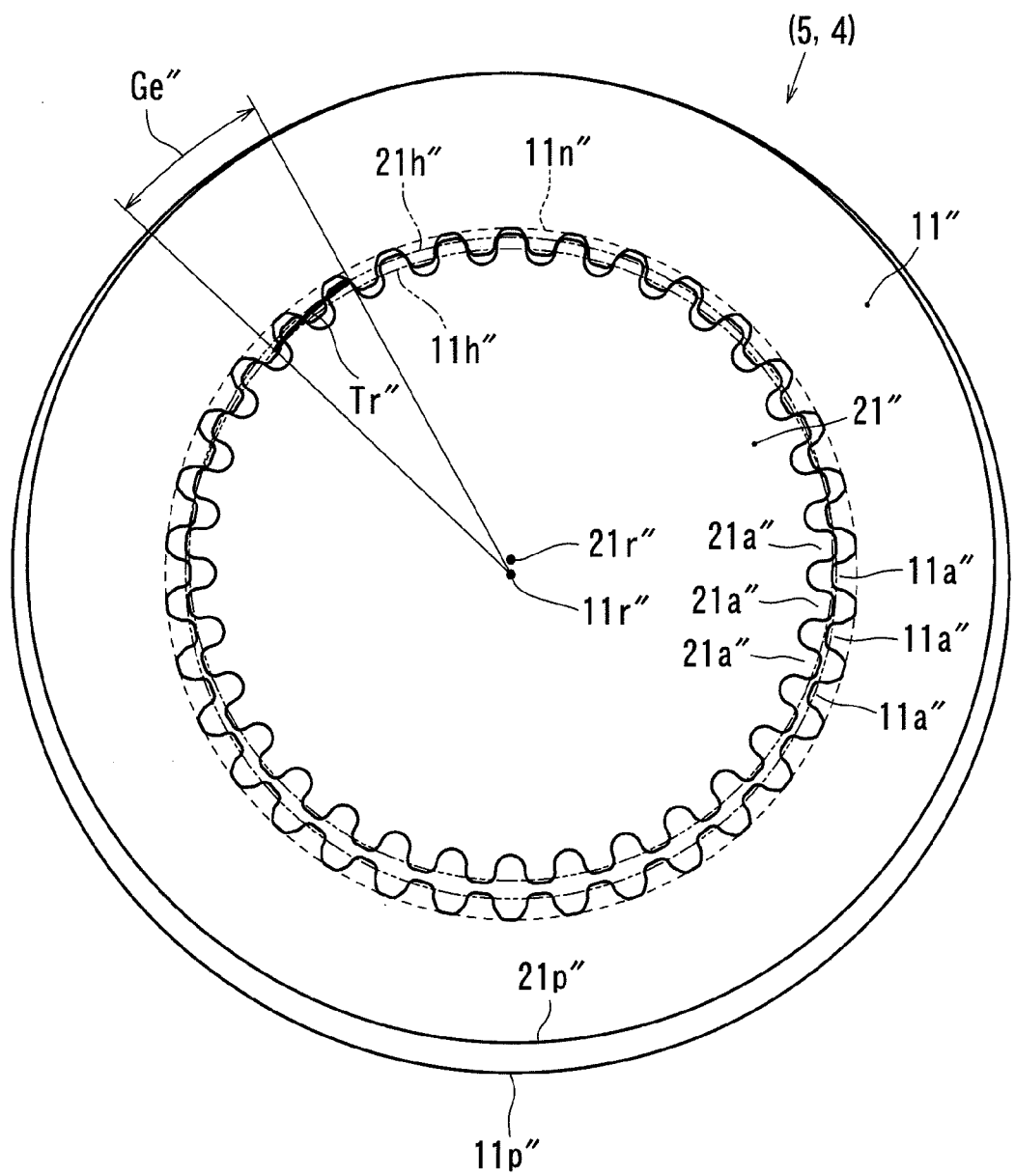
FIG. 14 is a view which illustrates whole tooth profiles of internal and external gear wheels of a medium-sized reclining device.

Thus, although the reclining devices 4 and 5 are identical with each other in the distance between the centers, the teeth number and the diameters of the pitch circles, the sizes of the effective addendum circles thereof are arbitrarily determined. As a result, the reclining devices 4 and 5 may have the teeth profiles different from each other. Further, as shown in FIG. 14, an internal gear wheel $11''$ and an external gear wheel $21''$ of one of the reclining devices (4 and 5) can be formed by using the method described above, so as to respectively have middle-sized tooth profiles.

That is, while a teeth number of inwardly-faced teeth $11a''$ of the internal gear wheel $11''$, a teeth number of outwardly-faced teeth $21a''$ of the external gear wheel $21''$, diameters of pitch circles $11p''$ and $21p''$ of the gear wheel $11''$ and $21''$ and a distance between centers $11r''$ and $21r''$ are maintained, only diameters of the effective addendum circles $11h''$ and $21h''$ of the gear wheels can be arbitrarily determined such that the middle-sized tooth profiles can be formed. The tooth profiles thus formed may have a meshing line Tr'' that is positioned within a range (a meshing range Ge'') between the effective addendum circles $11h''$ and $21h''$. Further, sizes of the effective addendum circles $11h''$ and $21h''$ are respectively determined such that a dedendum circle $11n''$ of the internal gear wheel $11''$ has a diameter of 61.6 mm.

As a result, in this structure, the reclining devices (4 and 5) can rotate in the same behavior as each other. Therefore, the adjusting operation (the rotating operation) of the tilting angle of the seat back 2 can be performed while the both side of the seat back 2 are well-balanced and synchronized with each other. Further, a method of using the present embodiment will be omitted because it is described in the description of the structures of the reclining devices 4 and 5.

Further, for example, when known tooth profiles defined by involute curves are used in the larger reclining device 5, the following problems will arise. That is, in such a case, in order to increase the tooth profiles of the reclining device, the diameters of the pitch circles of the gear wheels must respectively be increased. Therefore, when only the diameters of the pitch circles are increased without changing the teeth number of the gear wheels, the module of each of the gear wheels can be increased. As a result, the distance between the centers of the gear wheels can be increased.

If a correction is performed in order to reduce the distance between the centers, the non-meshing teeth of the gear wheels can be positioned closer to each other, so as to be easily interfered with each other. Therefore, in order to avoid the interference of the teeth of the gear wheels, the gear wheels must be reshaped by trimming tooth tips thereof. However, when the tooth tips of the gear wheels are trimmed, the meshing line is shortened, so that the meshing ratio (the meshing strength) can be reduced. Thus, when the reclining devices having the tooth profiles that are different from each other in size are formed using the involute curves, the reclining devices cannot substantially be formed so as to be rotated in the same behavior as each other while being well-balanced with each other.

Thus, according to the rotation mechanism of the present embodiment, even if the tooth profile of the reclining device 5 is shaped so as to be greater than the tooth profile of the reclining device 4, the reclining devices can respectively have desirable meshing ratios. Therefore, the reclining devices can be rotated in the same behavior as each other. As a result, due to the cooperating motion of the reclining devices 4 and 5 each having a different size, the adjusting operation of the tilting angle of the seat back 2 can be smoothly performed while the both sides of the seat back 2 are well-balanced with each other.

Thus, the present invention has been described using an embodiment. However, various changes and modifications may be made to the present invention. For example, in the embodiment, the connecting device of the present invention is applied to the reclining device. However, the connecting device can be applied to various devices that are positioned between two frame members to relatively rotatably connect the frame members. Further, the connecting device (the reclining device) can be applied to a device that connects the seat back to a vehicle floor.

Further, the connecting device can be applied to a device that is capable of rotatably connecting the vehicle seat to the vehicle floor. Further, the connecting device can be applied to a device that is capable of tiltably connecting an ottoman for supporting leg regions of a sitting person from below to the seat cushion or the vehicle floor.

Further, the number of the teeth of the external gear wheel can be larger than the number of the teeth of the internal gear wheel. In such a case, upon relative revolving motion of the external gear wheel, the external gear member can rotate relative to the internal gear member in a direction against the direction shown in the embodiment described above. Further, in the embodiment, the meshing line of the gear wheels is defined by the spiral of Archimedes. However, the meshing line can be defined by a spiral of Bernoulli.

Further, the meshing line can be defined by a non-spiral, i.e., a straight line (including a polygonal line) and a curve. Further, the curve and the spiral drawn as the meshing line can include a fine polygonal line approximate to a curve. Further, in the embodiment, similar to the larger reclining device, the smaller reclining device is formed so as to have the tooth profiles of which the meshing line is defined by the spiral. However, the smaller reclining device can be formed so as to have tooth profiles of which the meshing line is defined by an involute curve or a trochoidal curve.

What is claimed is:

1. A rotation mechanism in which two connection devices relatively rotatably connecting two subject components are axially oppositely disposed such that the subject components can be coaxially rotated, each of the connection devices comprising:

an internal gear wheel connected to one of the two subject components and having inwardly-faced teeth that are formed in an inner circular circumferential surface thereof; and an external gear wheel connected to the other of the two subject components and having outwardly-faced teeth that are formed in an outer circular circumferential surface thereof, the outwardly-faced teeth configured to mesh with the inwardly-faced teeth, wherein the external gear wheel of each of the connection devices has a diameter smaller than a diameter of the internal gear wheel thereof and has a teeth number different from a teeth number of the internal gear wheel, wherein relative rotational motion of the two subject components is performed by rotational displacement of the external gear wheel due to the different teeth number when the external gear wheel meshing with the internal gear wheel relatively revolves along the inwardly-faced teeth of the internal gear wheel while changing a meshing position therebetween, wherein each of the connection devices has a different size, wherein the internal gear wheels and the external gear wheels of the connection devices respectively have the same teeth number as each other, wherein the internal gear wheels and the external gear wheels of the connection devices are formed such that distances between centers thereof are equal to each other, wherein a spiral meshing line of the internal gear wheel and the external gear wheel of at least the larger of the connection devices is formed between a first addendum circle of the internal gear wheel and a second addendum circle of the external gear wheel, and wherein the spiral meshing line is drawn as a line that is defined by a spiral of Archimedes that extends in a circumferential direction from a point on the first addendum circle of the internal gear wheel to a point on the second addendum circle of the external gear wheel, the first addendum circle and the second addendum circle being gradually spaced from each other in the circumferential direction.

2. The rotation mechanism as defined in claim 1, wherein the spiral meshing line of the internal gear wheel and the external gear wheel of each of the connection devices is formed between the first addendum circle of the internal gear wheel and the second addendum circle of the external gear wheel, and wherein the spiral meshing line is drawn as a line that is defined by a spiral of Archimedes that extends in a circumferential direction from a point on the first addendum circle of the internal gear wheel to a point on the second addendum circle of the external gear wheel, the first addendum circle and the second addendum circle being gradually spaced from each other in the circumferential direction.

3. The rotation mechanism as defined in claim 1, wherein each of the connection devices is constructed as a reclining device that rotatably connects a seat back of a vehicle seat to a seat cushion such that a tilting angle of the seat back can be adjusted.

* * * * *